Jan. 24, 1950     C. K. MOUSEL     2,495,538
EVAPORATIVE COOLER
Filed July 24, 1947     2 Sheets-Sheet 1
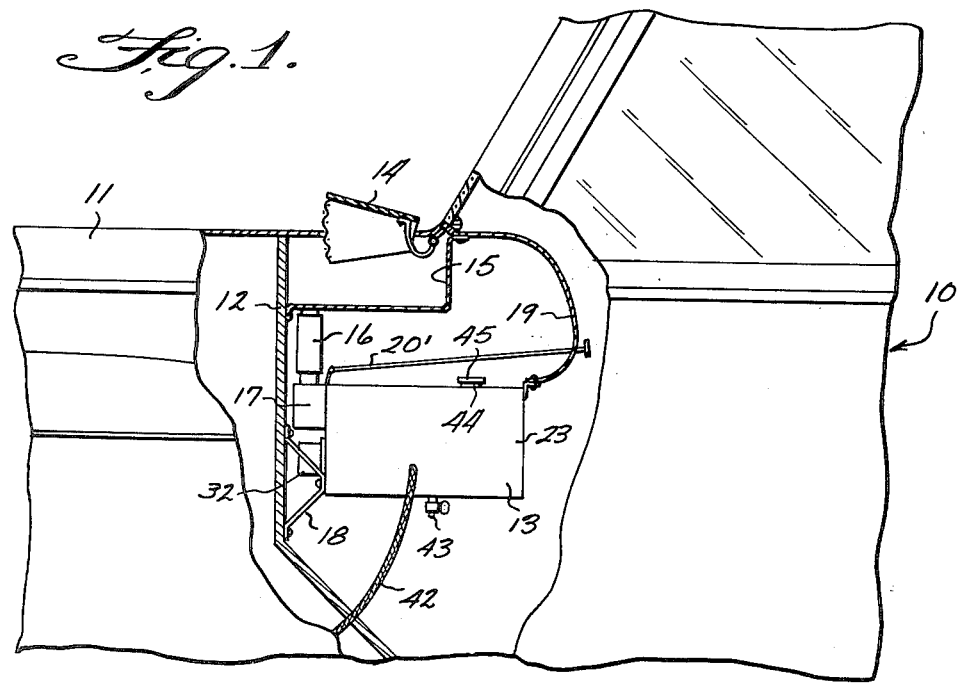
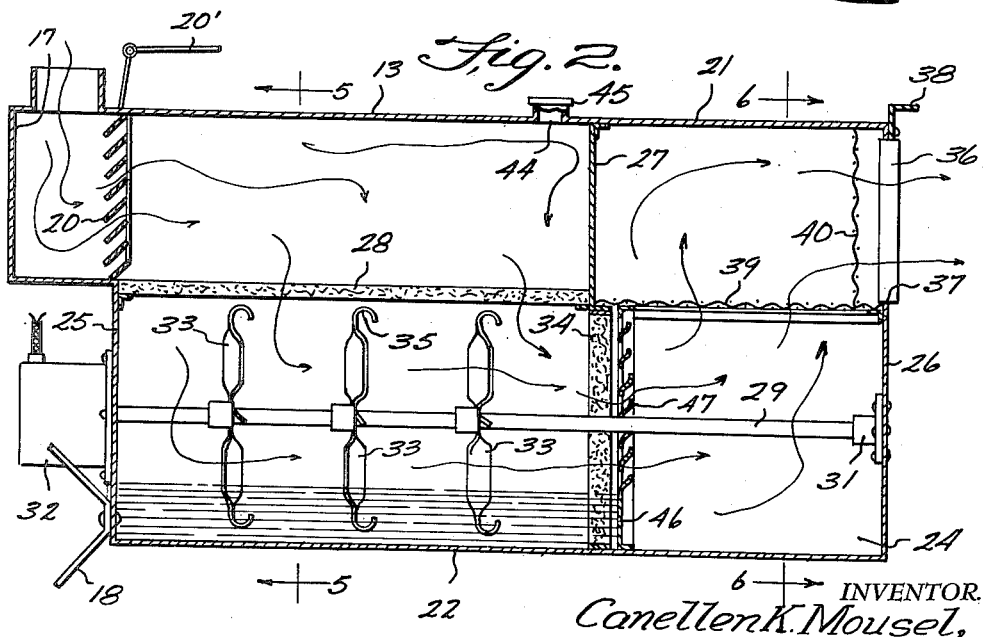
INVENTOR.
Canellen K. Mousel,
BY Victor J. Evans & Co.
ATTORNEYS Jan. 24, 1950  C. K. MOUSEL  2,495,538
EVAPORATIVE COOLER
Filed July 24, 1947  2 Sheets-Sheet 2
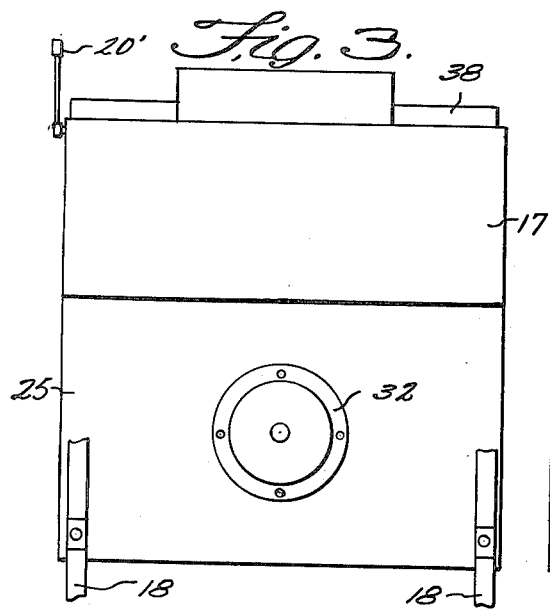
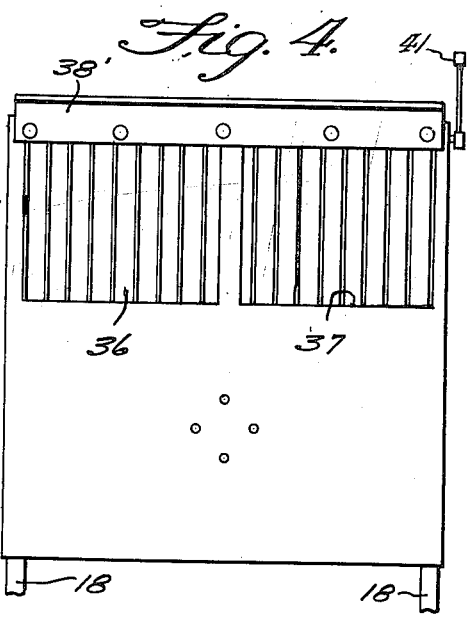
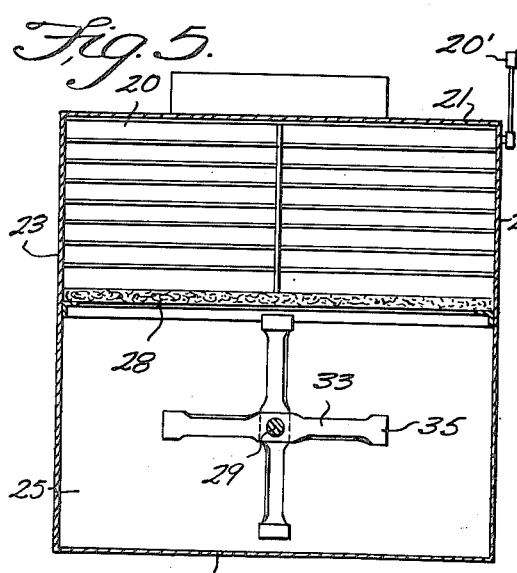
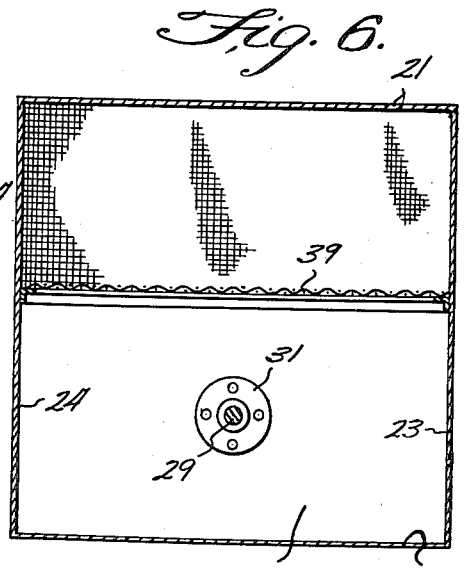
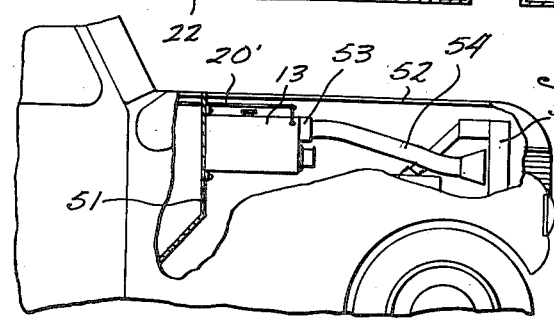
INVENTOR.
Canetten K. Mousel,
BY Victor J. Evans & Co.
ATTORNEYS Patented Jan. 24, 1950

2,495,538

UNITED STATES PATENT OFFICE 2,495,538

EVAPORATIVE COOLER

Canellen K. Mousel, Edison, Nebr.

Application July 24, 1947, Serial No. 763,339

1 Claim. (Cl. 261—92)

This invention relates to a cooling apparatus and more particularly to such apparatus as may be adapted for use with a motor vehicle.

It is an object of the present invention to provide a compact cooling device through which air is extended and cooled by water within the device as it passes therethrough and wherein the passage of the cooling air is effected by fan blades which also serve to throw water upon a filtering device.

Other objects of the present invention are to provide a cooling device which is of simple construction, inexpensive to manufacture, adapted to fit a motor vehicle and efficient in operation.

For other objects and for a better understanding of the invention, reference may be had to the following detailed description taken in connection with the accompanying drawing, in which Fig. 1 is a fragmentary side elevational view of a motor vehicle with a portion broken away to show the arrangement of the cooling device therewithin.

Fig. 2 is an enlarged longitudinal cross-sectional view of the cooling device.

Figs. 3 and 4 are respectively opposite end elevational views of the cooling device.

Figs. 5 and 6 are respectively transverse cross-sectional views taken on lines 5—5 and 6—6 of Fig. 2.

Fig. 7 is a side elevational view of a vehicle employing an air cooling device constructed similarly to the device shown in the other figures but arranged under the hood of the vehicle and with an air scoop extending forwardly over the engine and in front of the radiator.

Referring now to the figures, 10 represents the body of a motor vehicle having a hood 11 and a dash 12 on which is mounted my cooling device 13. Within the cowl is the usual cover 14 adapted to be lifted and beneath this cover is a casing 15 into which the air entering the cowl is passed. This collected air passes downwardly through a hose 16 and into a fitting 17 attached to my cooling device 13. The cooling device 13 is mounted on the dash 12 by means of a bracket 18. The rearward end of the cooling device 13 can be supported on a bracket 19. To control the air entering the device 13, there is provided in the fitting 17 adjustable vanes 20 which are controlled by a rod 20' extending rearwardly and through brackets 19.

Referring now particularly to Fig. 2, the cooling device comprises a casing having top and bottom and side and end portions, 21, 22, 23, 24, 25 and 26. The fitting 17 enters the end portion 25. Air passes into the top part of the casing which is divided longitudinally thereof by a baffle wall 27. The air as it enters is filled with dust particles and is collected in a space above a filter 28 extending longitudinally of the casing between end wall 25 and the baffle 27.

Below the filter 28 is a longitudinally extending shaft 29 which is journalled at its rear end in a bearing 31 fixed to the end portion 26 and is driven and connected to an electric motor 32 secured to the end portion 26. The motor 32 drives the shaft 29. On this shaft are a plurality of axially spaced fan blades 33 which direct the air rearwardly and through a second filter 34 extending vertically beneath the baffle wall 27.

The bottom of the casing is filled with water and the fan blades 33 have thrower projections 35 for throwing the water onto the filter 28 so as to keep it saturated and so as to clean and cool the air which is drawn downwardly therethrough. The cooled air is moved rearwardly by the fan blades 33, through the filter 34, upwardly and through adjustable slats or louvres 36 in an opening 37 in the end portion 26 of the casing. Above the louvres 36 and secured to the end portion 26 is an angle bracket 38 to which the bracket 19 is attached. A control lever 41 operates the louvres 36.

Screens 39 and 40 are disposed within the rear end of the casing. These screens will prevent dirt or other articles from passing the opening 37 to the bottom of the casing.

In order to maintain the level of the water within the casing at the proper and pre-determined level, there is provided a drain pipe 42 which leads through the bottom of the dash and will deliver the surplus water to the ground. Also at times of cool weather it will be desired to strain the water from the cooler and for this purpose there is provided a pet cock 43.

For filling the cooling device with water, there is provided an inlet formation 44 adapted to be closed by a cap 45. With the cap removed water can be poured into the cooler.

Air leaving filter 34 is directed upwardly by member 46 with louvre openings 47 therein whereby the air will be directed upwardly toward screen 39.

In Fig. 7, cooling device 13 is shown mounted on dash 51 so as to extend forwardly under hood 52 of the vehicle. Control rod 20' extends rearwardly through the dash. A modified fitting 53 is provided on the forward end of the device 13 and to this fitting there is attached an air scoop

54 which extends forwardly under the hood to a location adjacent radiator 55 disposed below the vehicle hood 52 and adapted to take in cool air from the front of the vehicle.

While various changes may be made in the detail construction, it will be understood that such changes shall be within the spirit and scope of the present invention as defined by the appended claim.

I claim:

A cooling device adapted for use with motor vehicles comprising a casing having top and bottom parts, a filter extending longitudinally through the casing and separating the top and bottom parts, said top part having an inlet opening for receiving the air, a shaft extending longitudinally through the bottom part of the casing, said bottom part being adapted to retain a body of water or other cooling medium, said shaft having a combined water thrower and fan blade thereon adapted to pick up the water and throw it against the filter above the same whereby the air passing the filter will be cooled and adapted to direct the cooled air axially through the casing, outlet means in the casing, a motor connected to the shaft and mounted on the casing to drive the shaft, a partition or baffle wall extending vertically in the top part of the casing, and a second filter extending vertically beneath the baffle plate and surrounding the shaft, said casing having an opening in the rear end wall forming the outlet for the casing, adjustable louvres lying within the opening, and wire screens extending vertically and forwardly of the outlet opening and longitudinally above the top edge of the second filter device and dividing the top part of the casing from the bottom part at a location in rear of the baffle plate.

CANELLEN K. MOUSEL.

REFERENCES CITED

The following references are of record in the file of this patent:

UNITED STATES PATENTS

| Number | Name | Date |
|---|---|---|
| 1,951,270 | Bradburn | Mar. 13, 1934 |
| 2,017,579 | Anderson | Oct. 15, 1935 |
| 2,037,760 | Chapman | Apr. 21, 1936 |
| 2,055,958 | Amos | Sept. 29, 1936 |
| 2,104,119 | Forbush | Jan. 4, 1938 |
| 2,162,439 | Lintern et al. | June 13, 1939 |
| 2,162,805 | Farr | June 20, 1939 |
| 2,175,779 | Mohrdieck | Oct. 10, 1939 |
| 2,185,486 | Wahlberg | Jan. 2, 1940 |
| 2,189,348 | Mayo | Feb. 6, 1940 |
| 2,198,156 | Findley | Apr. 23, 1940 |
| 2,262,384 | Cooper | Nov. 11, 1941 |
| 2,361,076 | Agee, Jr. | Oct. 24, 1944 |
| 2,431,146 | Steele | Nov. 18, 1947 |